United States Patent [19]

Robertson et al.

[11] Patent Number: 5,308,291

[45] Date of Patent: May 3, 1994

[54] BELT CONSTRUCTION, THE COMBINATION OF THE BELT CONSTRUCTION AND A PULLEY AND METHODS OF MAKING THE SAME

[75] Inventors: Larry A. Robertson, Springfield; Ernest C. Arnsmeyer, Billings, both of Mo.

[73] Assignee: Dayco Products, Inc., Dayton, Ohio

[21] Appl. No.: 962,639

[22] Filed: Oct. 16, 1992

[51] Int. Cl.⁵ ............................................. F16G 1/28
[52] U.S. Cl. .................................. 474/205; 474/250; 474/252
[58] Field of Search ............... 474/204, 205, 249, 250, 474/252; 156/138

[56] References Cited

U.S. PATENT DOCUMENTS

| | | | |
|---|---|---|---|
| 2,802,511 | 8/1957 | Waugh | 156/138 |
| 4,002,082 | 1/1977 | Waugh | 474/252 X |
| 4,011,766 | 3/1977 | Waugh | 474/250 X |
| 4,359,355 | 11/1982 | Stecklein et al. | 156/138 |
| 4,571,224 | 2/1986 | Arinaga | 474/205 X |
| 4,647,278 | 3/1987 | Hull | 474/205 |
| 4,702,729 | 10/1989 | Tanaka et al. | 474/205 |
| 4,832,670 | 5/1989 | Miranti, Jr. | 474/205 |
| 4,884,998 | 12/1989 | Miranti | 474/250 X |
| 4,913,690 | 4/1990 | DiGiacomo et al. | 474/250 |
| 4,976,662 | 12/1990 | Miranti | 474/205 |
| 5,013,286 | 5/1991 | Breher | 474/205 |
| 5,055,090 | 10/1991 | Miranti | 474/249 |

FOREIGN PATENT DOCUMENTS

| | | | |
|---|---|---|---|
| 248852 | 8/1987 | Fed. Rep. of Germany | 474/205 |
| 3802754 | 3/1989 | Fed. Rep. of Germany | 474/249 |

*Primary Examiner*—Ramon S. Britts
*Assistant Examiner*—Roger J. Schoeppel
*Attorney, Agent, or Firm*—Joseph V. Tassone

[57] ABSTRACT

The combination of an endless power transmission belt construction and pulley therefor, the belt construction and methods of making the same are provided, the belt construction having an inner surface defining a plurality of longitudinally disposed and alternately spaced apart like longitudinal projections and longitudinal grooves that are adapted to mesh with a ribbed surface of a pulley, the inner surface of the belt construction being cogged and defining a plurality of transversely disposed and alternately spaced apart transverse projections and transverse grooves, the transverse grooves each having a depth that is approximately one-half of the depth of the longitudinal grooves and that is approximately one-fourth of the thickness of the belt construction.

20 Claims, 3 Drawing Sheets

BELT CONSTRUCTION, THE COMBINATION OF THE BELT CONSTRUCTION AND A PULLEY AND METHODS OF MAKING THE SAME

BACKGROUND OF THE INVENTION

1. Field of the Invention

This invention relates to a new endless power transmission belt construction and to a new combination of the belt construction and a rotatable pulley means as well as to new methods of making the same.

2. Prior Art Statement

It is known to provide the combination of an endless power transmission belt construction having opposed side edge means and having opposed inner surface means and outer surface means with the inner surface means defining a plurality of longitudinally disposed and alternately spaced apart like longitudinal projections and longitudinal grooves, the belt construction having a certain thickness, and a rotatable pulley means having an outer peripheral ribbed surface means meshing with a portion of the inner surface means of the belt construction and defining a plurality of longitudinally disposed and alternately spaced apart like longitudinal projections and longitudinal grooves that respectively have portions thereof for serially meshing respectively with cooperating portions of the longitudinal grooves and longitudinal projections of the inner surface means of the belt construction, the depth of the longitudinal grooves of the inner surface means of the belt construction being substantially less than the approximately 2.4 mm depth of the longitudinal grooves of a similar belt construction that is adapted to have the inner surface means thereof mesh with the ribbed surface means of the pulley means, the inner surface means being cogged and defining a plurality of transversely disposed and alternately spaced apart transverse projections and transverse grooves. For example, see the copending U.S. Pat. application of Jack D. White, Jr., Ser. No. 717,223, filed Jun. 18, 1991.

Also see the U.S. Pat. to Hull, No. 4,647,278, the U.S. Pat. to Miranti, Jr. No. 4,832,670, and the U.S. Pat. to DiGiacomo et. al., No. 4,913,690, each of which discloses an inner surface means of an endless power transmission belt having longitudinal grooves and projections and transverse grooves and projections therein.

Also see the U.S. Pat. to Hull, No. 4,647,27R, the U.S. Pat. to Miranti, Jr. No. 4,832,670, and the U.S. Pat. to DiGiacomo et al, No. 4,913,690, each of which discloses an inner surface means of an endless power transmission belt having longitudinal grooves and projections and transverse grooves and projections therein.

SUMMARY OF THE INVENTION

It is one feature of this invention to provide a new endless power transmission belt construction that has a ribbed inner surface means that cooperates with the outer ribbed surface means of a pulley means in a manner to tend to reduce a "siren" type of noise that occurs on some automotive drives that have very high belt speeds and at least one small pulley having a high degree of belt wrap.

In particular, it has been found according to the teachings of this invention that typically such pulley cog beltseach has a relatively large cog depth to permit the belt construction to readily flex around a small diameter pulley that has a high degree of belt wrap thereon and it is believed according to the teachings of this invention that such deep cogs result in large air movements creating such adverse noise.

However, it has been found according to the teachings of this invention that when utilizing an endless belt construction that has a reduced depth of the longitudinal grooves thereof, the cog depth should likewise be substantially reduced so that the cog depth is approximately one-half of the depth of the longitudinal grooves and is approximately one-fourth of the thickness of the belt construction whereby such an endless belt construction will operate with less adverse noise.

For example, one embodiment of this invention provides the combination of an endless power transmission belt construction having opposed side edge means and having opposed inner surface means and outer surface means with the inner surface means defining a plurality of longitudinally disposed and alternately spaced apart like longitudinal projections and longitudinal grooves, the belt construction having a certain thickness, and a rotatable pulley means having an outer peripheral ribbed surface means meshing with a portion of the inner surface means of the belt construction and defining a plurality of longitudinally disposed and alternately spaced apart like longitudinal projections and longitudinal grooves that respectively have portions thereof for serially meshing respectively with cooperating portions of the longitudinal grooves and longitudinal projections of the inner surface means of the belt construction, the depth of the longitudinal grooves of the inner surface means of the belt construction being substantially less than the approximately 2.4 mm depth of the longitudinal grooves of a similar belt construction that is adapted to have the inner surface means thereof mesh with the ribbed surface means of the pulley means, the inner surface means being cogged and defining a plurality of transversely disposed and alternately spaced apart transverse projections and transverse grooves, the transverse grooves each having a depth that is approximately one-half of the depth of the longitudinal grooves and that is approximately one-fourth of the thickness of the belt construction.

Accordingly, it is an object of this invention to provide a new combination of an endless power transmission belt construction and a rotatable pulley means therefor, the combination of this invention having one or more of the novel features of this invention as set forth above or hereinafter shown or described.

Another object of this invention is to provide a new method of making such a combination, the method of this invention having one or more of the novel features of this invention as set forth above or hereinafter shown or described.

Another object of this invention is to provide a new endless power transmission belt construction having one or more of the novel features of this invention as set forth above or hereinafter shown or described.

Another object of this invention is to provide a new method of making such an endless power transmission belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 2 is an enlarged, fragmentary, cross-sectional view taken on line 2—2 of FIG. 1, and illustrating the belt construction meshing with a ribbed surface means of a rotatable pulley means or the like.

DESCRIPTION OF THE PREFERRED EMBODIMENT

Figure 1:
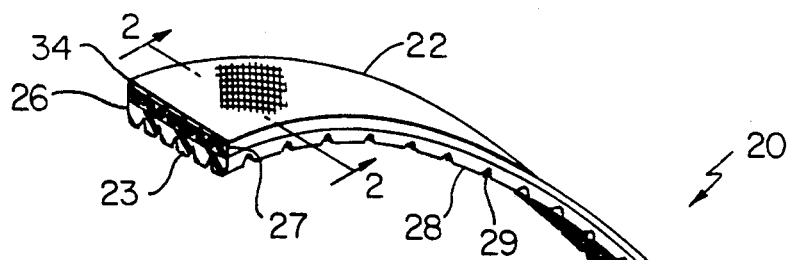
FIG. 1 is a broken away perspective view of the new endless power transmission belt construction of this invention.

While the various features of this invention are hereinafter illustrated and described as being particularly adapted to provide belt constructions for use with pulley means of an internal combustion engine, it is to be understood that the various features of this invention can be utilized singly or in various combinations thereof to provide belt constructions for other types of apparatus as desired.

Therefore, this invention is not to be limited to only the embodiment illustrated in the drawings, because the drawings are merely utilized to illustrate one of the wide variety of uses of this invention.

Figure 2:
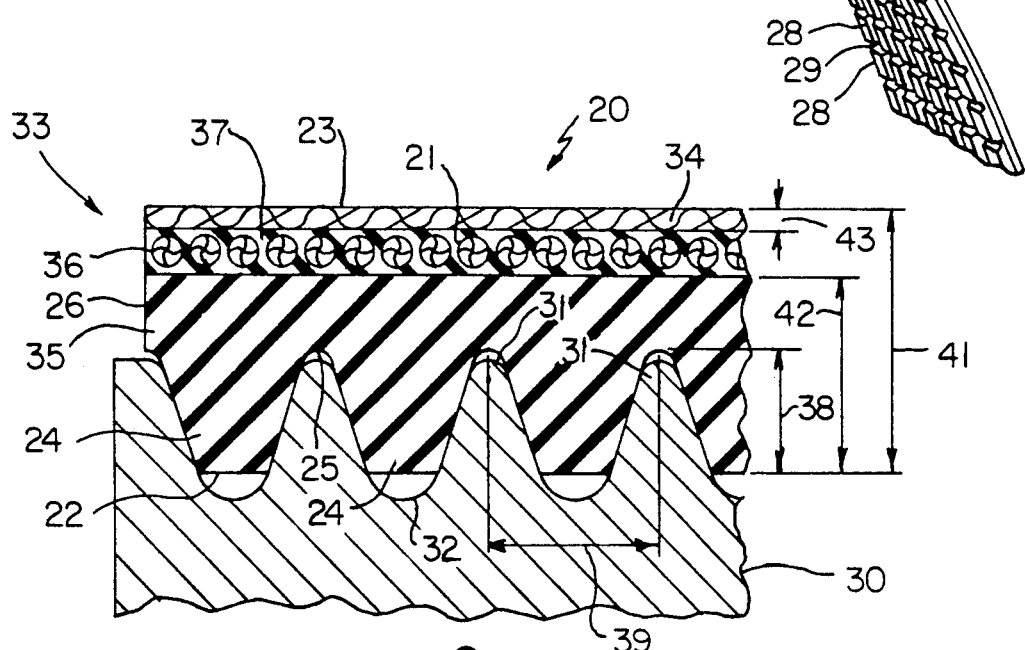

Referring now to FIGS. 1 and 2, the endless power transmission belt construction of this invention is generally indicated by the reference numeral 20 and is formed of any suitable material, such as polymeric material, the belt construction 20 having a load carrying cord 21 also formed of any suitable material, such as polyester, in a manner conventional in the art and having opposed inner surface means 22 and outer surface means 23. The inner surface means 22 is longitudinally ribbed and thereby has a plurality of longitudinally disposed and alternately spaced apart like longitudinal projections 24 and longitudinal grooves 25 disposed substantially parallel to and intermediate opposed parallel side edge means 26 and 27 of the belt construction 21 also in a manner well known in the art. In addition, the inner surface means 22 of the belt construction 20 is cogged and thereby defines a plurality of transversely disposed and alternately spaced apart transverse projections 28 and transverse grooves 29 also in a manner well known in the art.

However, the longitudinal grooves 25 and transverse grooves 29 of the belt construction 20 of this invention respectively have depths that are uniquely selected to tend to reduce the operating noise of the belt construction 20 as will be apparent hereinafter.

The belt construction 20 is adapted to be driven in an endless path by a driving sheave or pulley means that is operatively interconnected to the crank shaft of an internal engine of a transportation vehicle in a manner well known in the art so as to drive other pulley means for operating various automotive components of such a drive system. For example, see the U.S. Pat. to Henderson, No. 4,596,538 whereby this U.S. patent is being incorporated into this disclosure by this reference thereto.

Such a driving or driven pulley means is generally indicated by the reference numeral 30 in FIG. 2 and has a ribbed external peripheral surface means 31 defining a plurality of longitudinally disposed and alternately spaced apart like longitudinal projections 31 and longitudinal grooves 32 that respectively have portions thereof for serially meshing respectively with cooperating portions of the longitudinal grooves 25 and longitudinal projections 24 of the inner surface means 22 of the belt construction 21 in a manner well known in the art to form the combination of this invention that is generally indicated by the reference numeral 33 in FIG. 2.

As previously stated, it is known to provide longitudinal projections and grooves in an inner surface means of an endless belt construction as well as to provide transverse projections and grooves in that inner surface means in order to readily permit that belt construction to be utilized with pulleys similar to the pulley means 30 and have that belt construction be wrapped around pulleys that have relatively small diameters.

The belt construction disclosed in the aforementioned copending U.S. Pat. application, Ser. No. 717,223, filed Jun. 18, 1991, has such structure not only in the inner surface means thereof but also in the order surface means thereof whereas the aforementioned U.S. Pat. to Hull, No. 4,647,278, U.S. Pat. to Miranti, Jr. No. 4,832,670 and U.S. Pat. to DiGiacomo, No. 4,913,690 have only the inner surface means thereof formed with such projections and grooves as in the belt construction 20 of this invention whereby the U.S. Pat. to Hull, No. 4,647,278, U.S. Pat. to Miranti, Jr. No. 4,832,670 incorporated into this disclosure by this reference thereto.

It can be seen in FIG. 2 that the outer surface means 23 of the belt construction 20 is substantially flat and is defined by an outer tension section 34 of the belt construction 20 which also comprises an inner compression section 35 and a load carrying section 36 that comprises a cushion layer means 37 and the previously described cord 21 formed together in a manner well known in the art. For example, the cushion layer 37 is initially disposed against the compression layer 36 and then the cord 21 is wound on top of the cushion layer 37 to be subsequently forced therein by the tension layer 34 during the building of the belt construction 20.

The depth of the longitudinal grooves of the endless belt construction of the aforementioned U.S. Pat. to Hull, No. 4,647,278 and the aforementioned patent to Miranti, Jr., No. 4,832,670 is approximately 2.4 mm (0.095 of an inch) whereas the aforementioned copending U.S. Pat. application, Ser. No. 717,223, filed Jun. 18, 1991 teaches that the depth of the longitudinal grooves of a belt construction should be substantially less than the approximately 2.4 mm depth and will still function with the conventionally ribbed pulley to provide for an extended life of the belt construction when being utilized with pulleys that have small diameters, such depth of the longitudinal grooves being approximately 2.0 mm while the pitch for the grooves remain at the normal 3.56 mm dimension for a belt construction that has a depth of approximately 2.4 mm for the longitudinal grooves thereof.

As previously stated, it has been found according to the teachings of this invention that when utilizing the smaller depth of approximately 2.0 mm for the longitudinal grooves of an endless belt construction, the depth of the transverse grooves 29 should be approximately one-half of the depth of the longitudinal grooves and approximately one-fourth of the thickness of the belt construction in order to have reduced noise during the operation of the belt construction in contrast to the operating noise of a similar belt construction that has deep transverse cogs.

Figure 3:
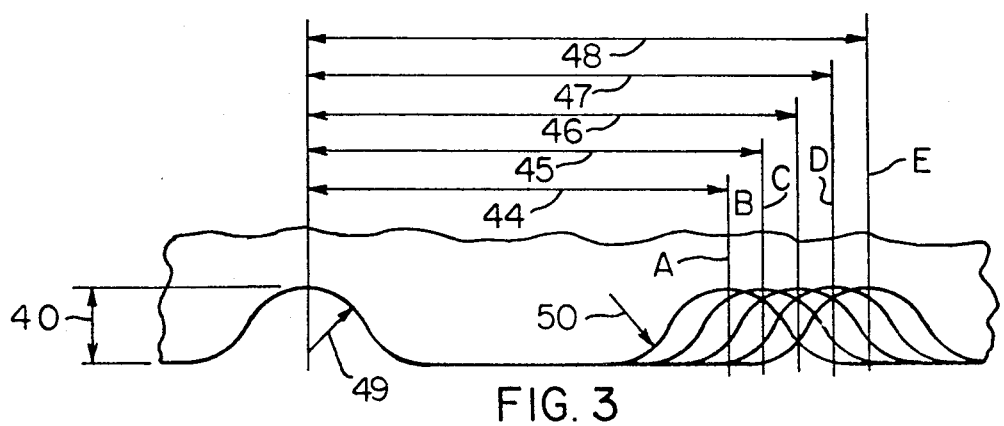
FIG. 3 is a fragmentary and schematic side view illustrating how the longitudinal spacings between the transverse grooves of the belt construction of FIG. 1 are developed.

Accordingly, one working embodiment of the belt construction 20 of this invention is illustrated in FIGS. 2 and 3 wherein the longitudinal grooves 25 have a depth 38 of approximately 2.0 mm (approximately 0.080 of an inch) and have a pitch 39 of approximately 3.56 mm (approximately 0.140 of an inch), with the depth 40 of the transverse grooves 29 being approximately 1.143 mm (approximately 0.045 of an inch) and with the overall thickness 41 of the belt construction 20 being approximately 4.572 mm (approximately 0.180 of an inch).

In such working embodiment of the belt construction 20, the height 42 of the compression section 35 is approximately 2.54 mm (approximately 0.100 of an inch) while the height 43 of the tension section 34 is approximately 0.762 mm (approximately 0.030 of an inch).

Figure 4:
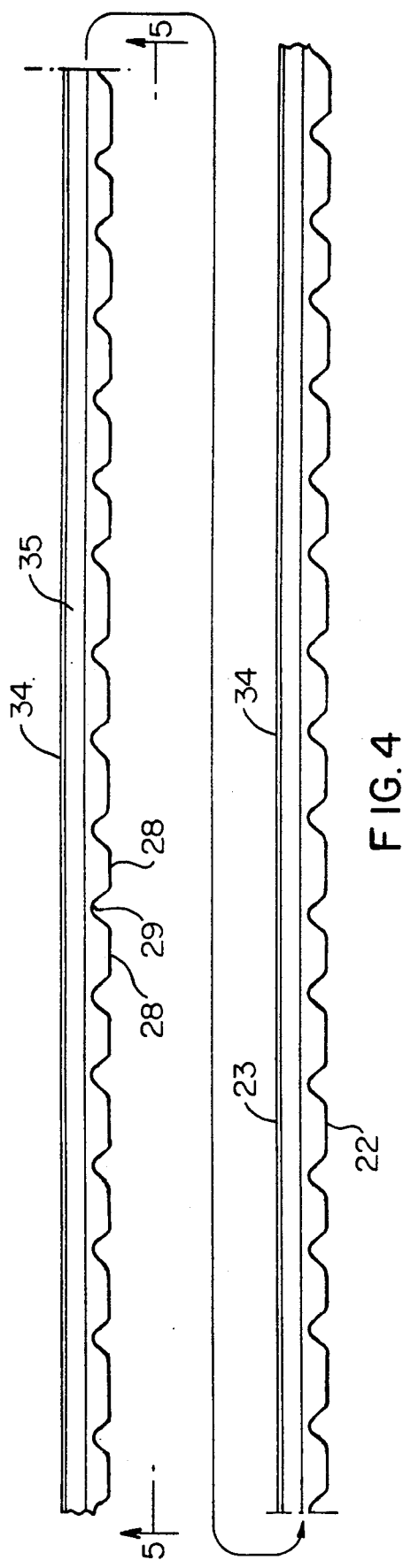
FIG. 4 is an enlarged fragmentary side view of the belt construction of FIG. 1 and illustrates one complete sequence of the staggered pattern of the longitudinal spacings between the transverse grooves thereof.
Figure 5:
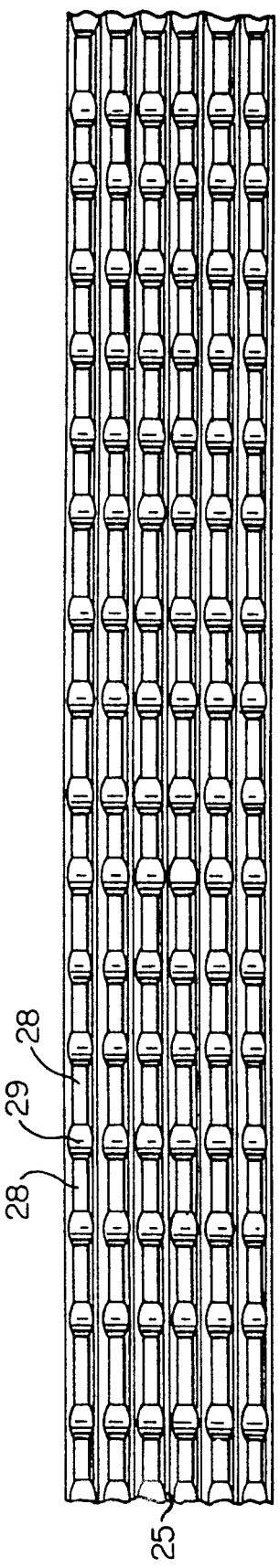
FIG. 5 is a fragmentary bottom view of the belt construction illustrated in FIG. 4 and is taken in the direction of arrows 5—5 of FIG. 4.

In such working embodiment of the belt construction 20 of this invention, the transverse projections 28 are formed in a random repeating pattern that is fully disclosed in the aforementioned U.S. Pat. to Miranti, Jr., No. 4,832,670, and comprises five different spacings 44, 45, 46, 47 and 48 between adjacent transverse grooves 29 respectively being defined in FIG. 3 by lines A, B, C, D and E. By so arranging the spacings 44–48, a generally random staggered spacing arrangement can comprise a sequence of 34 spacings A-E with the belt construction 20 then having a repeating of such sequence of spacings over and over again throughout the entire longitudinal length of the belt construction 20. In the one working embodiment of the belt construction 20, each sequence comprises the following order:

AECCDBCBDCEABBCADCEBADDBEC-BEADCBDC as illustrated in FIG. 4.

Such working embodiment of the belt construction 20 of this invention has the lengths of the spacings 44–48 respectively as approximately 0.290 of an inch; approximately 0.314 of an inch; approximately 0.338 of an inch; approximately 0.362 of an inch and approximately 0.386 of an inch with an average depth 40 of each transverse groove 29 being approximately 0.045 of an inch and with the radii 49 and 50 each being approximately 0.045 of an inch.

It was found that a similar working embodiment of the belt construction 20 of this invention runs substantially quieter than a belt construction that has the prior known larger cog depths than set forth by the teachings of this invention.

Figure 6:
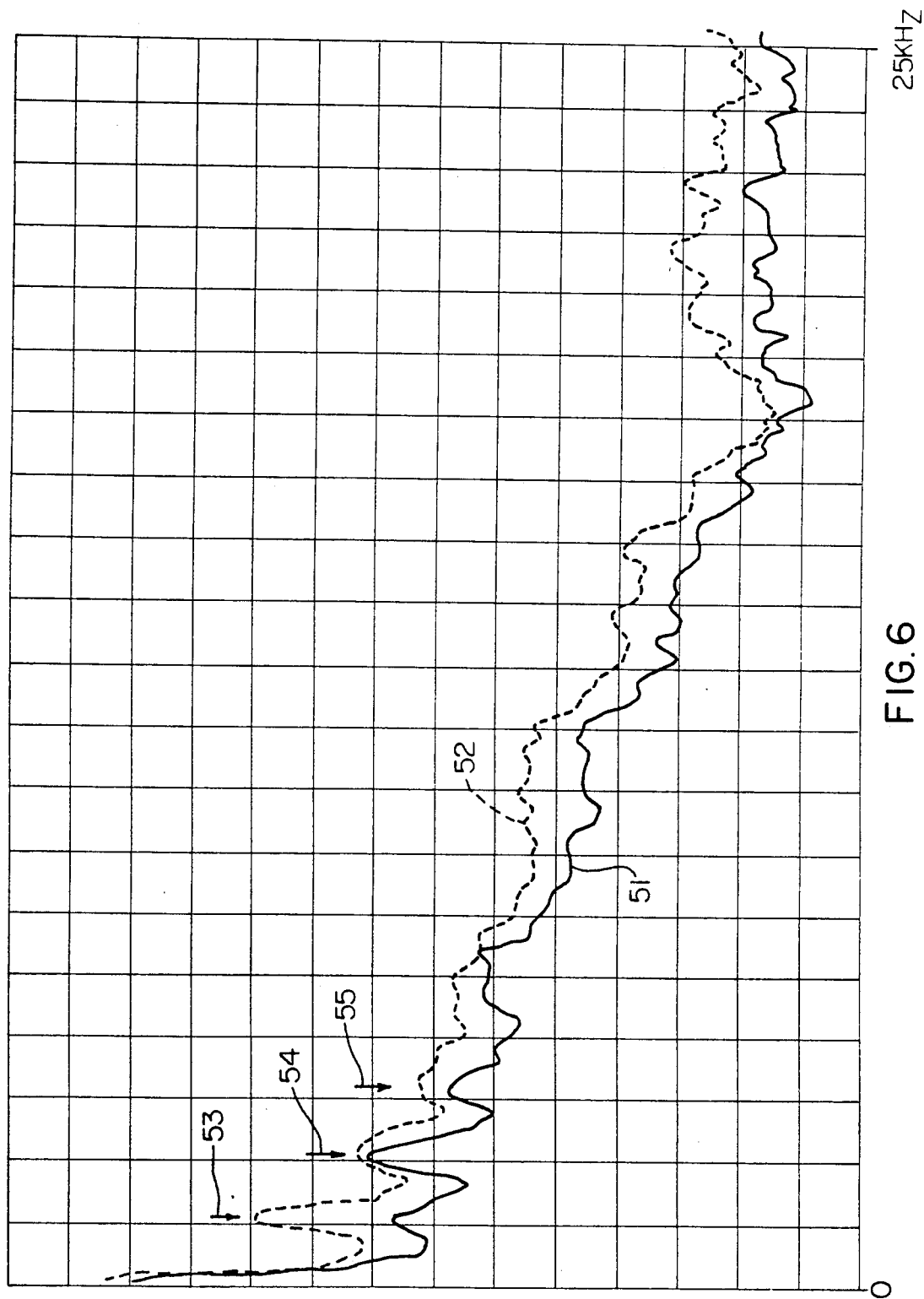
FIG. 6 is a graph illustrating by a dash line the noise spectrum for a conventional deep cog ribbed belt and illustrating by a full line the noise spectrum for a new shallow cog ribbed belt of this invention, the Y axis being the sound pressure level and the X axis being the frequency of the noise.

For example, reference is now made to the graph of FIG. 6 wherein the noise spectrum for the operation of the belt construction 20 of this invention is illustrated by the solid line 51 and wherein the belt construction 20 had a thickness of approximately 5.2 mm (approximately 0.206 of an inch), a depth of approximately 2.5 mm (approximately 0.100 of an inch) for the longitudinal grooves and a depth of approximately 1.143 mm (approximately 0.045 of an inch) for the transverse grooves whereas the noise spectrum for the operation of a deep cog belt construction is illustrated by the dash line 52 and wherein the belt construction for line 52 has the same dimensions as the belt construction 20 for line 51 except the depth of the transverse grooves is approximately 2.4 mm (approximately 0.095 of an inch), the Y axis of the graph being the sound pressure level in decibels and the X 10 axis being the frequency from 0 to approximately 25 KHz. The arrows 53, 54 and 55 respectively represent the frequency of the noise at 1400 Hz, 2700 Hz and 4000 Hz which comprise respectively the first, second and third harmonics whereby it can be seen that the belt construction 20 of this invention as represented by the full line 51 runs substantially quieter than the prior known belt construction as represented by the dashed line 52.

Thus, it can be seen that this invention not only provides a new combination of a belt construction and pulley means therefor, but also this invention provides a new belt construction and a new method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In the combination of an endless power transmission belt construction having opposed side edge means and having opposed inner surface means and outer surface means with said inner surface means defining a plurality of longitudinally disposed and alternately spaced apart like longitudinal projections and longitudinal grooves, said belt construction having a certain thickness, and a rotatable pulley means having an outer peripheral ribbed surface means meshing with a portion of said inner surface means of said belt construction and defining a plurality of longitudinally disposed and alternately spaced apart like longitudinal grooves and longitudinal projections that respectively have portions thereof for serially meshing respectively with cooperating portions of said longitudinal projections and longitudinal grooves of said inner surface means of said belt construction, the depth of said longitudinal grooves of said inner surface means of said belt construction being substantially less than the approximately 2.4 mm depth of the longitudinal grooves of a similar belt construction that is adapted to have the inner surface means thereof mesh with said ribbed surface means of said pulley means, said inner surface means being cogged and defining a plurality of transversely disposed and alternately spaced apart transverse projections and transverse grooves, the improvement wherein said transverse grooves each has a depth that is approximately one-half of said depth of said longitudinal grooves and that is approximately one-fourth of said thickness of said belt construction.

2. A combination as set forth in claim 1 wherein said depth of said longitudinal grooves in said inner surface means of said belt construction is approximately 2.032 mm.

3. A combination as set forth in claim 2 wherein said depth of said transverse grooves of said belt construction is approximately 1.143 mm.

4. A combination as set forth in claim 3 wherein said certain thickness of said belt construction is approximately 4.572 mm.

5. A combination as set forth in claim 4 wherein said longitudinal grooves of said belt construction have a pitch that is approximately 3.56 mm.

6. A combination as set forth in claim 1 wherein said transverse grooves are spaced from each other in a longitudinal direction of said belt construction so as to define longitudinal spacings therebetween that are staggered.

7. A combination as set forth in claim 6 wherein said longitudinal spacings comprise different lengths that are arranged in a random sequence of a certain number of said lengths with that sequence then being repeated throughout the length of said belt construction in said longitudinal direction thereof.

8. In an endless power transmission belt construction having opposed side edge means and having opposed inner surface means and outer surface means with said inner surface means defining a plurality of longitudinally disposed and alternately spaced apart like longitudinal projections and longitudinal grooves, said belt construction having a certain thickness, said belt construction being adapted to above said inner surface means thereof mesh with a ribbed outer peripheral surface means of a rotatable pulley means that has said ribbed means defining a plurality of longitudinally disposed and alternately spaced apart like longitudinal grooves and longitudinal projections that respectively have portions thereof for serially meshing respectively with cooperating portions of said longitudinal projections and longitudinal grooves of said inner surface jeans of said belt construction, the depth of said longitudinal grooves of said inner surface means of said belt construction being substantially less than the approximately 2.4 mm depth of the longitudinal grooves of a similar belt construction that is adapted to have the inner surface means thereof mesh with said ribbed surface means of said pulley means, said inner surface means being cogged and defining a plurality of transversely disposed and alternately spaced apart transverse projections and transverse grooves, the improvement wherein said transverse grooves each has a depth that is approximately one-half of said depth of said longitudinal grooves and that is approximately one-fourth of said thickness of said belt construction.

9. A belt construction as set forth in claim 8 wherein said depth of said longitudinal grooves in said inner surface means of said belt construction is approximately 2.032 mm.

10. A belt construction as set forth in claim 9 wherein said depth of said transverse grooves of said belt construction is approximately 1.143 mm.

11. A belt construction as set forth in claim 10 wherein said certain thickness of said belt construction is approximately 4.572 mm.

12. A belt construction as set forth in claim 11 wherein said longitudinal grooves of said belt construction have a pitch that is approximately 3.56 mm.

13. A belt construction as set forth in claim 8 wherein said transverse grooves are spaced from each other in a longitudinal direction of said belt construction so as to define longitudinal spacings therebetween that are staggered.

14. A belt construction as set fort in claim 13 wherein said longitudinal spacings comprise different lengths that are arranged in a random sequence of a certain number of said lengths with that sequence then being repeated throughout the length of said belt construction in said longitudinal direction thereof.

15. In a method of making an endless power transmission belt construction having opposed side edge means and having opposed inner surface means and outer surface means with said inner surface means defining a plurality of longitudinally disposed and alternately spaced apart like longitudinal projections and longitudinal grooves, said belt construction having a certain thickness, said belt construction being adapted to have said inner surface means thereof mesh with a ribbed outer peripheral surface means of a rotatable pulley means that has said ribbed surface means defining a plurality of longitudinally disposed and alternately spaced apart like longitudinal grooves and longitudinal projections that respectively have portions thereof for serially meshing respectively with cooperating portions of said longitudinal projections and longitudinal grooves of said inner surface means of said belt construction, the depth of said grooves of said inner surface means of said belt construction being substantially less than the approximately 2.4 mm depth of the longitudinal grooves of a similar belt construction that is adapted to have the inner surface means thereof mesh with said ribbed surface means of said pulley means, said inner surface means being cogged and defining a plurality of transversely disposed and alternately spaced apart transverse projections and transverse grooves, the improvement comprising the step of forming said transverse grooves to each have a depth that is approximately one-half of said depth of said longitudinal grooves and that is approximately one-fourth of said thickness of said belt construction.

16. A method as set forth in claim 15 and including the step of forming said depth of said longitudinal grooves in said inner surface means of said belt construction to be approximately 2.032 mm.

17. A method as set forth in claim 16 and including the step of forming said depth of said transverse grooves of said belt construction to be approximately 1.143 mm.

18. A method as set forth in claim 17 and including the step of forming said certain thickness of said belt construction to be approximately 4.572 mm.

19. A method as set forth in claim 18 and including the step of forming said longitudinal grooves of said belt construction to have a pitch that is approximately 3.56 mm.

20. A method as set forth in claim 15 and including the step of forming said transverse grooves to be spaced from each other in a longitudinal direction of said belt construction so as to define longitudinal spacings therebetween that are staggered with said longitudinal spacings comprising different lengths that are arranged in a random sequence of a certain number of said lengths with that sequence then being repeated throughout the length of said belt construction in the longitudinal direction thereof.

* * * * *